T. B. LUNDIN.
MACHINE FOR CLOSING AND SEALING ENVELOPS.
APPLICATION FILED JUNE 8, 1920.

1,374,593.

Patented Apr. 12, 1921.
7 SHEETS—SHEET 1.

WITNESS
Gustav Genzlinger

INVENTOR.
Truell B Lundin
by A. V. ...
atty.

T. B. LUNDIN.
MACHINE FOR CLOSING AND SEALING ENVELOPS.
APPLICATION FILED JUNE 8, 1920.

1,374,593.

Patented Apr. 12, 1921.
7 SHEETS—SHEET 2.

WITNESS.

INVENTOR.

T. B. LUNDIN.
MACHINE FOR CLOSING AND SEALING ENVELOPS.
APPLICATION FILED JUNE 8, 1920.

1,374,593.

Patented Apr. 12, 1921.
7 SHEETS—SHEET 3.

WITNESS

INVENTOR.

T. B. LUNDIN.
MACHINE FOR CLOSING AND SEALING ENVELOPS.
APPLICATION FILED JUNE 8, 1920.
1,374,593.
Patented Apr. 12, 1921.
7 SHEETS—SHEET 4.
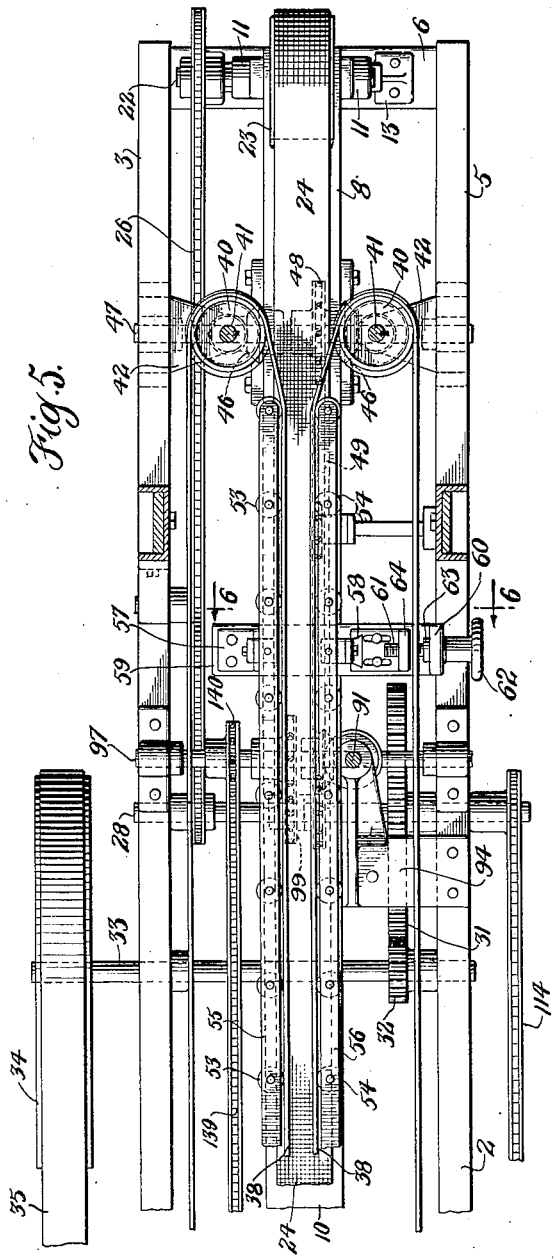
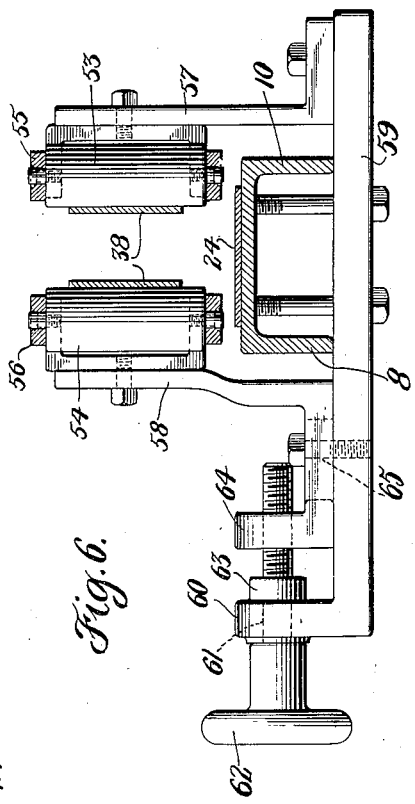
WITNESS
Gustav Genzlinger.
INVENTOR.
Trued B. Lundin
by A. V. ....
atty.

T. B. LUNDIN.
MACHINE FOR CLOSING AND SEALING ENVELOPS.
APPLICATION FILED JUNE 8, 1920.
1,374,593.
Patented Apr. 12, 1921.
7 SHEETS—SHEET 5.
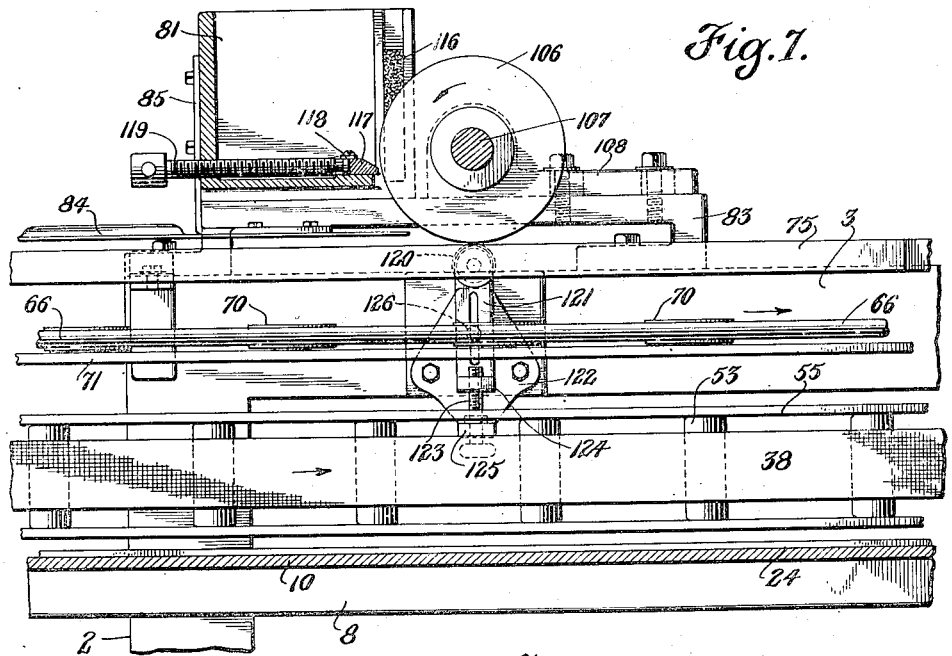
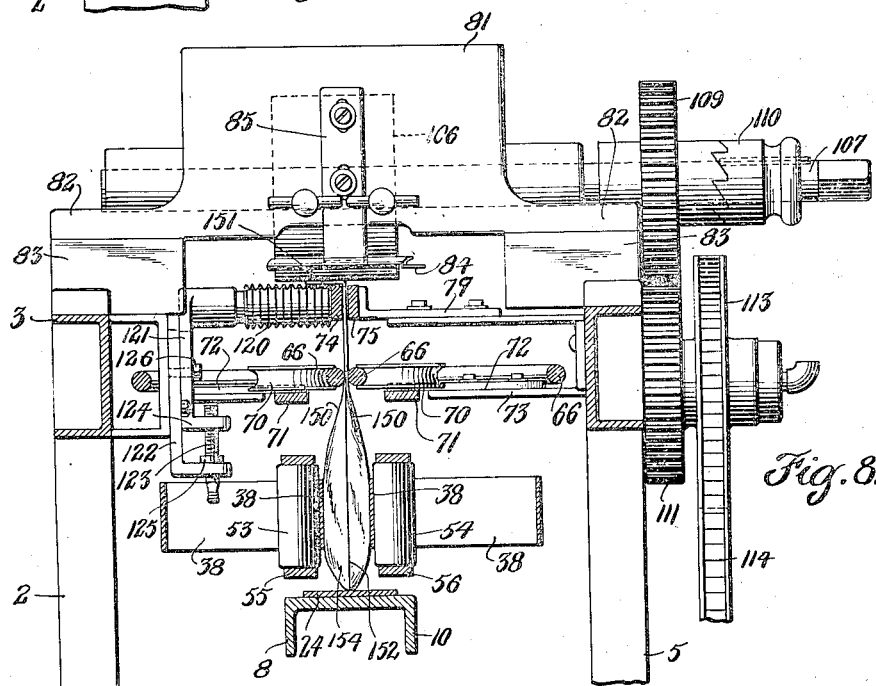

T. B. LUNDIN.
MACHINE FOR CLOSING AND SEALING ENVELOPS.
APPLICATION FILED JUNE 8, 1920.

1,374,593.

Patented Apr. 12, 1921.
7 SHEETS—SHEET 6.

WITNESS
Gustav Genzlinger.

INVENTOR.
Trued B. Lundin
by A. V. Gronfel
atty.

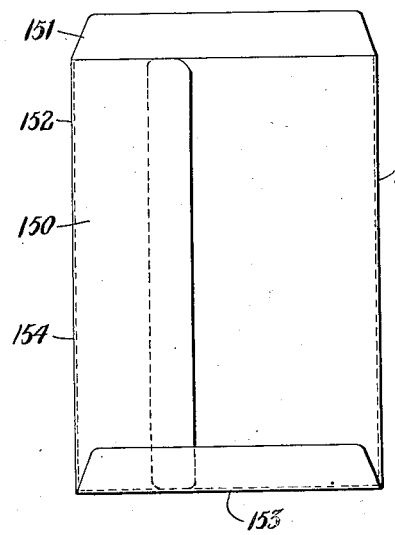
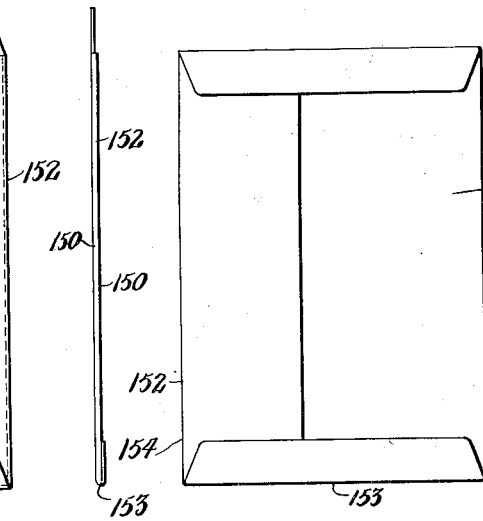
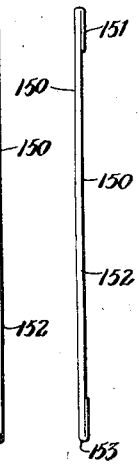
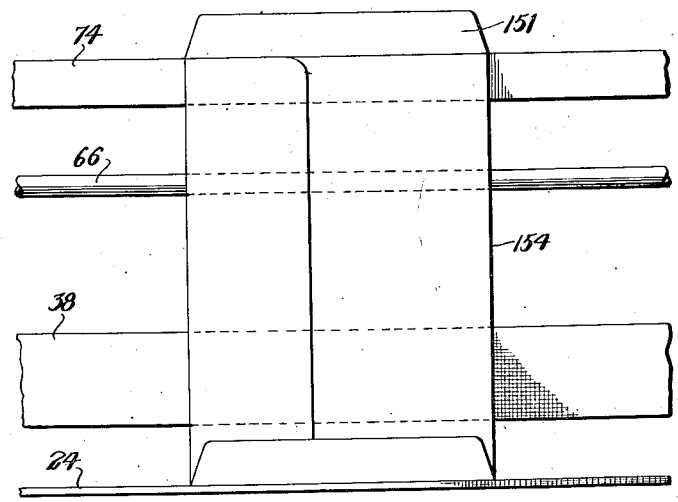

UNITED STATES PATENT OFFICE.

TRUED B. LUNDIN, OF PHILADELPHIA, PENNSYLVANIA, ASSIGNOR TO AMERICAN MACHINERY CO., INC., OF PHILADELPHIA, PENNSYLVANIA, A CORPORATION OF DELAWARE.

MACHINE FOR CLOSING AND SEALING ENVELOPS.

1,374,593.   Specification of Letters Patent.   Patented Apr. 12, 1921.

Application filed June 8, 1920. Serial No. 387,363.

*To all whom it may concern:*

Be it known that I, TRUED B. LUNDIN, a citizen of the United States, residing at Philadelphia, in the county of Philadelphia and State of Pennsylvania, have invented certain new and useful Improvements in Machines for Closing and Sealing Envelops, of which the following is a specification.

The object of my invention is to provide a novel, simple and efficient machine for closing and sealing the open ends of envelops; and, with this object in view, the invention consists in the novel construction, combination and arrangement of parts as will be hereinafter described and claimed.

In the accompanying drawings illustrating my invention,

Fig. 5 is a horizontal section through the rearward end portion of the machine on the line 4—4 of Fig. 1.

Fig. 6 is a transverse section of the machine, on line 7—7 of Fig. 5, showing the supplemental frame and parts carried thereby.

Fig. 7 is a longitudinal section through a portion of the machine showing the paste applying device and adjacent parts.

Fig. 8 is a transverse section through a portion of the machine, on line 9—9 of Fig. 1.

Figs. 11 and 12 are face and edge views, respectively, of a form of envelop adapted to be closed and sealed by the machine, showing the closing flap therefor in the open position.

Figs. 13 and 14 are views similar to Figs. 11 and 12, respectively, showing the flap in the closed position.

Fig. 15 is a view showing the relation of the envelop to the supporting and guiding belts and bars of the machine therefor.

Figure 1:
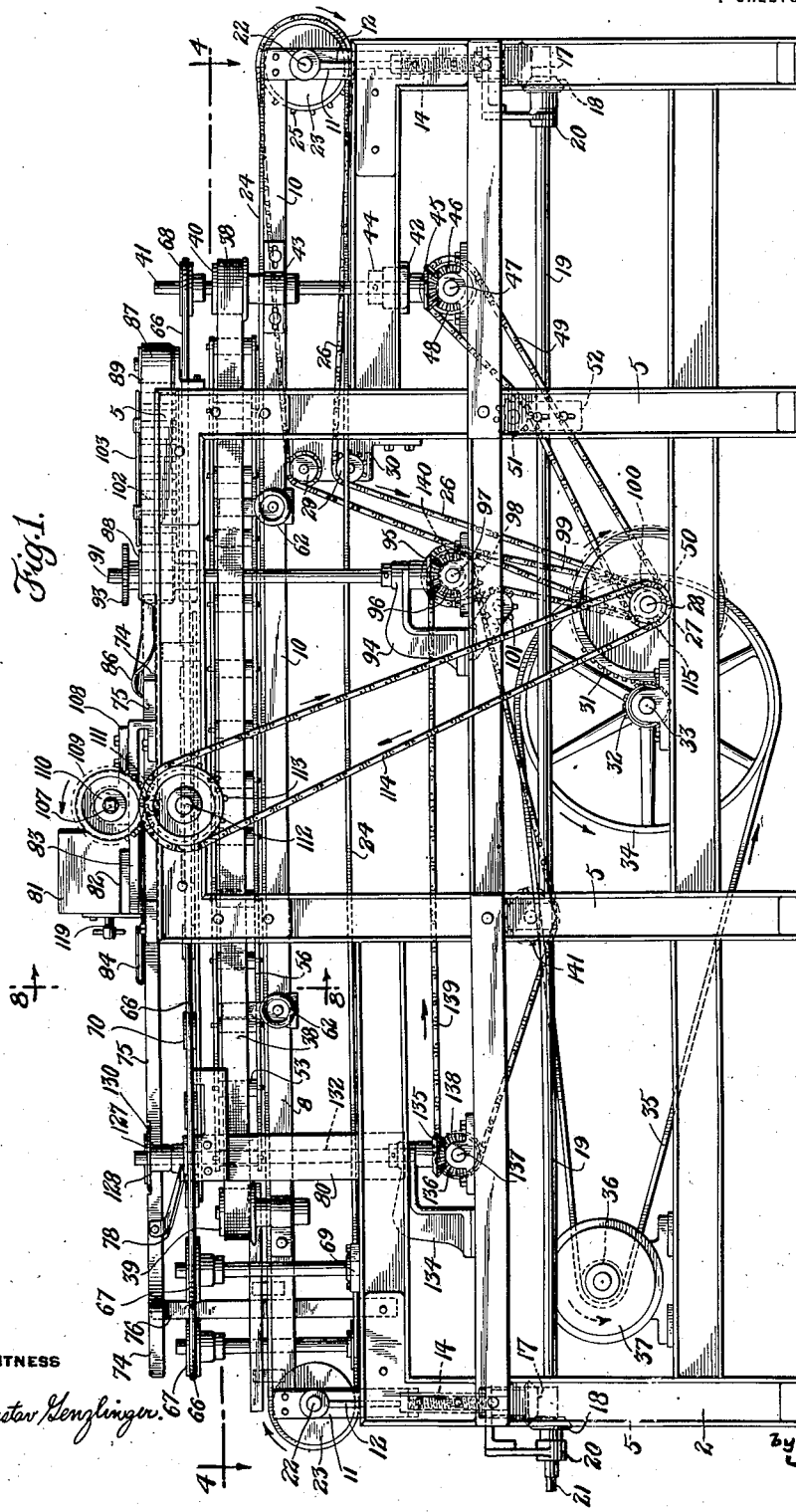
Figure 1 is a side elevation of an envelop closing and sealing machine embodying my invention.

Referring to the drawings, the main frame 2 of the machine comprises, as generally stated, spaced, parallel side members 3 and 5 and transverse connecting bars or members 6.

Extending longitudinally between the side members 3 and 5 of the main frame is a supplemental frame 8 comprising a long, horizontally-arranged channel bar 10 having vertically-arranged brackets or end members 11 secured to the respective ends thereof. The sides of the end members 11 have parallel grooves or channels in brackets 13 which are secured upon and project upwardly from the transverse bars 6 of the main frame. The supplemental frame 8 is supported by vertical screw-threaded shafts 14 which are screwed into the lower portions of the end members 11 thereof and which are journaled in suitable bearings 15 formed on the bars 6 of the main frame. The downward thrust of the shafts 14 is taken by collars 16 secured thereon and engaging the tops of the bearings 15. The shafts 14 extend below the bearings 15 and carry bevel gear wheels 17 which are in mesh with similar wheels 18 secured on a horizontal shaft 19 which extends longitudinally of the machine and which is mounted to turn in bearings 20 which project from the frame bars 6. One end of the shaft 19 extends outwardly and is made square, at 21, for the reception of suitable crank or tool by means of which it may be turned by hand. The gear wheels 17 and 18 are related to each other and to the threads on the shafts 14 so that when the shaft 19 is turned in one direction the threaded shafts 14 will raise the supplemental frame 8 relatively to the main frame 2, and so that when the shaft 19 is turned in the reverse direction the threaded shafts 14 will lower the supplemental frame. It will thus be seen that the supplemental frame 8 may be easily and quickly raised or lowered by hand to any desired position within its range of adjustment.

The end members 11 of the supplemental frame 8 have shafts 22 journaled therein which carry pulleys 23 around which passes a belt 24 the upper portion of which is adapted to pass over and to be supported by the channel bar 10 of the supplemental frame. This belt 24 forms a carrier to receive and support envelops and the contents thereof and to advance them through the machine, as will be hereinafter explained. One pulley shaft 22 extends outwardly and carries a sprocket wheel 25 driven by a chain 26 which passes around and extends between the wheel 25 and a sprocket wheel 27 on the main driving shaft 28 of the machine, whereby when power is applied to the shaft 28 the carrying belt 24 will be driven. The chain 26 is guided in its travel between the wheels 25 and 27 by two idlers 29 which turn on shafts carried by a bracket 30 on the main frame member 3 and which are located with relation to wheels 25 and 27, as shown in the drawings, to permit the wheel 25 to be raised and lowered with the supplemental frame 8 without disturbing the operative relationship between the chain 26 and the wheels 25 and 27.

The main driving shaft 28 extends between the side members 3 and 5 of the main frame and it is journaled in suitable bearings thereon and provided with a gear wheel 31 which is in mesh with a pinion 32 on a supplemental shaft 33 which also extends between the main frame members 3 and 5 and is journaled in suitable bearings thereon. The shaft 33 has a pulley 34 thereon driven by a belt 35 from the driving pulley 36 of a suitable electric motor 37 which is mounted on the main frame of the machine, so that when current is supplied to the motor 37, the main shaft 28 will be driven at the desired slow speed.

Arranged above the horizontal carrying belt 24, and extending parallel thereto, are two oppositely disposed vertical belts 38 which are spaced apart to receive envelops and the contents thereof between them. The belts 38 pass around pulleys 39 and 40 near the respective ends of the machine. These pulleys 39 and 40 have bottom flanges, as shown, to prevent downward displacement of the belts 38 thereon. The pulleys 39 are mounted to turn on short vertical shafts projecting from brackets on the sides of the supplemental frame 8, and the pulleys 40 are splined on vertical shafts 41 which turn in bearings 42 and 43 on the main and supplemental frames 2 and 8, respectively. The shafts 41 not only turn in the bearings 43 but they slide therein when the supplemental frame 8 is raised and lowered; and the pulleys 40 rest upon the bearings 43 and are raised and lowered therewith when the supplemental frame 8 is raised and lowered. The shafts 41 are supported by collars 44 resting upon the bearings 42, and, the lower ends of the shafts 41 are provided with bevel gear wheels 45 in mesh with similar wheels 46 on a horizontal shaft 47 which is mounted to turn in bearings on the side members 3 and 5 of the main frame, and which extends transversely therebetween. The shaft 47 is provided with a sprocket wheel 48 which is driven by a chain 49 from a sprocket wheel 50 on the main shaft 28. A suitable idler 51 is provided for maintaining the chain 49 in proper working engagement with the wheels 48 and 50. The idler 51 turns on a shaft carried by a bracket 52 on the side member 5 of the main frame. It will thus be seen that the belts 38 are driven in the direction of the arrows by the main driving shaft 28 and the gearing connecting them therewith. The inner or adjacent portions of the belts 38 which extend between the pulleys 39 and 40 are engaged on their outer faces by two series or sets of suitably spaced vertical rollers 53 and 54 carried by frames 55 and 56, respectively. The frames 55 and 56 are secured to brackets 57 and 58, respectively, which are mounted on two bars 59 secured to and extend transversely beneath and beyond the respective sides of the channel bar 10 of the supplemental frame 8, as clearly shown in Fig. 6. The brackets 57 are secured to the bars 59, and the brackets 58 are slidable thereon toward and from the brackets 57 to permit the roller frame 56 to be adjusted toward and from the roller frame 55 to vary the space between the opposing inner faces of the belts 38. To effect this adjustment, one end of each bar 59 is provided with an upwardly extending lug 60 in which is journaled a shaft 61 having a hand wheel 62 on the outer end thereof engaging the outer face of the lug 60 and having a collar 63 thereon engaging the inner face of the lug 60 to prevent longitudinal displacement of the shaft relatively to the lug. Each shaft 61 extends inwardly from its collar 63 and is screw-threaded and screwed into and through a lug 64 which extends upwardly from the outer portion of the adjacent bracket 58. It will thus be understood that by turning the hand wheels 62 the roller frame 56 may be adjusted toward or from the roller frame 55 to vary the space between the belts 38. The brackets 58 are guided during the adjustment thereof by the shafts 61 and screws 65 screwed into the bars 59 and extending through slots in the brackets 58.

Above the belts 38, and extending parallel thereto, are two oppositely disposed belts 66 which are round in cross section and which are adapted to clamp between them the upper portion of an envelop above the contents thereof. The belts 66 pass around grooved pulleys 67 and 68 near the respective ends of the machine. The pulleys 67 are mounted to turn on vertical shafts projecting from brackets 69 on the side members 3 and 5 of the main frame, and the pulleys 68 are secured upon the shafts 41 above the pulleys 40 so that when the shafts 41 are actuated to drive the belts 38, the belts 66 will be driven. The inner or adjacent portions of the belts 66 which extend between the pulleys 67 and 68 are engaged on their outer faces by two series or sets of suitably spaced grooved rollers 70 carried by bars 71 which are carried by arms 72 which are secured upon the brackets 73 which project from the side members 3 and 5 of the main frame. The arms 72 are secured to the brackets 73 by screw and slot connections which permits the arms 72 to be adjusted transversely of the machine to adjust the inner or adjacent portions of the belts 66 toward and from each other.

Above the round belts 66 are two parallel bars 74 and 75 which are spaced a slight distance apart to receive and guide the upper, open end portion of an envelop between them. The bar 74 is supported by brackets 76 and 77 projecting from the side member 3 of the main frame, and the bar 75 is supported by brackets 78 and 79, projecting from the side member 5 of the main frame, and a bracket 80 thereon, respectively.

Figure 2:
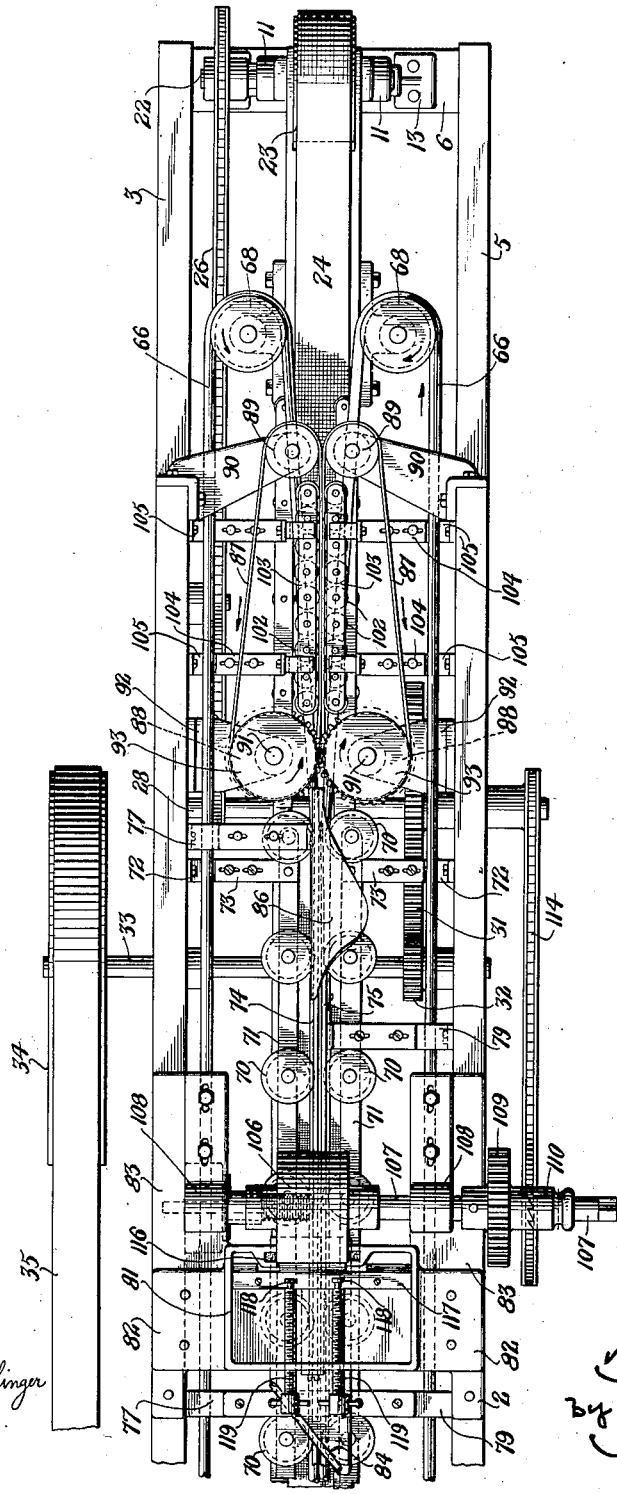
Fig. 2 is a top view of the rearward or delivery end portion of the machine.
Figure 3:
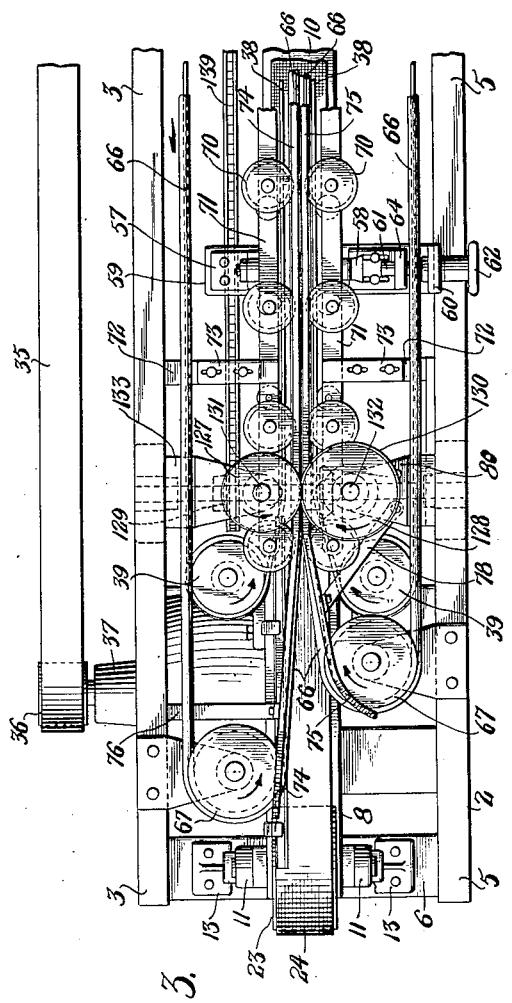
Fig. 3 is a top view of the forward or feed end portion of the machine.
Figure 4:
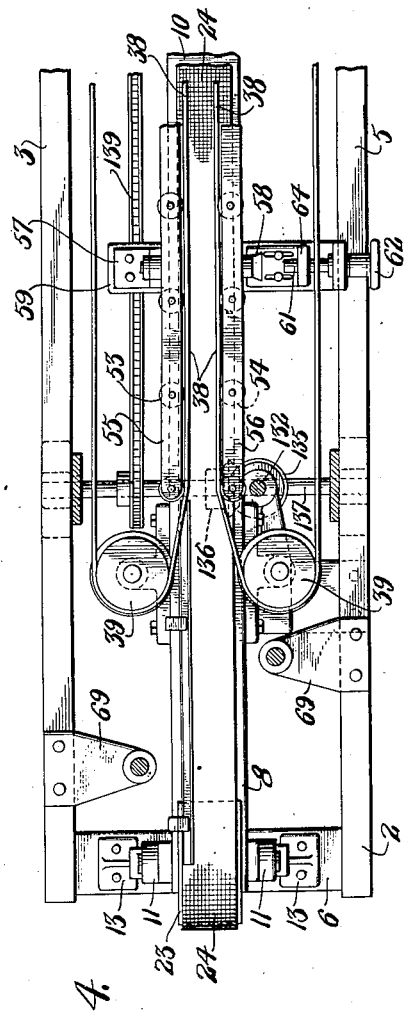
Fig. 4 is a horizontal section through the forward end portion of the machine, on line 4—4 of Fig. 1.
Figure 9:
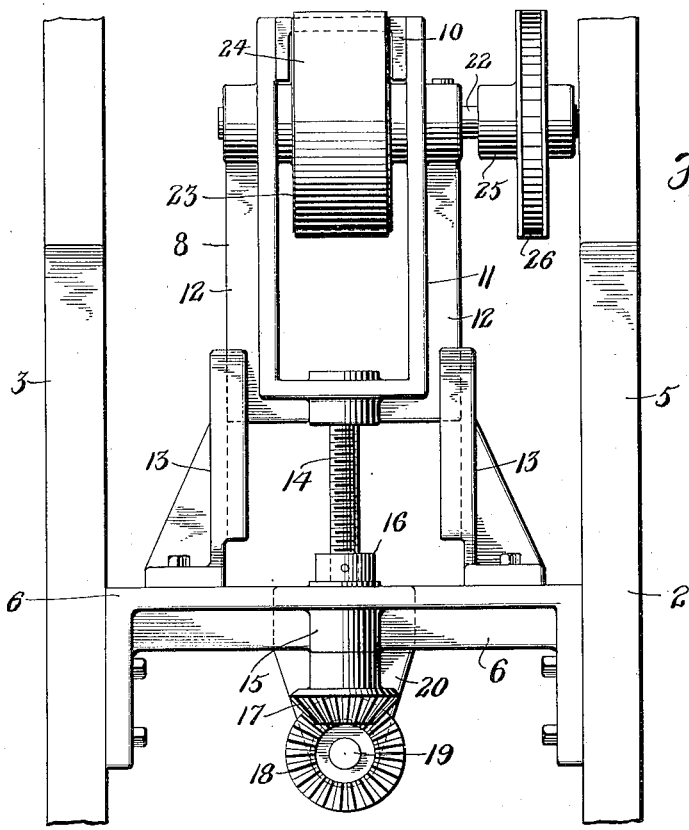
Fig. 9 is an elevation of the rearward end of a portion of the machine.
Figure 10:
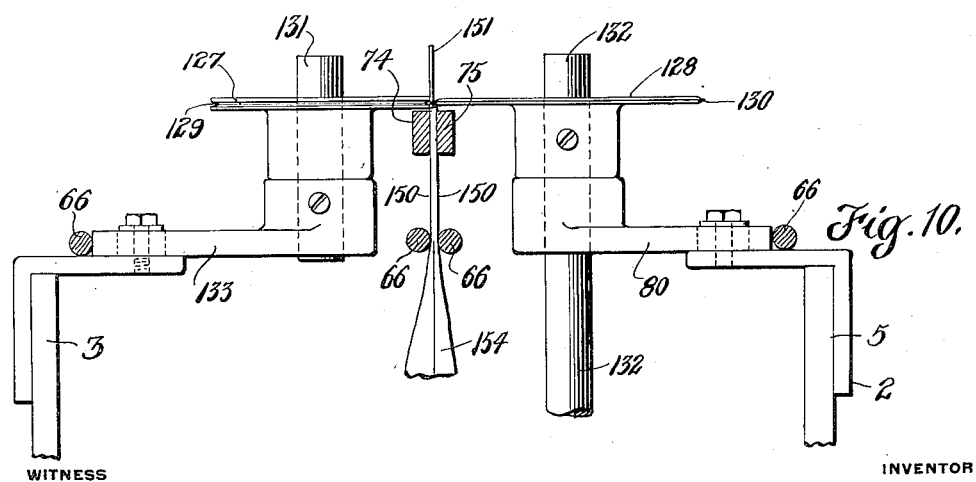
Fig. 10 is a sectional detail, showing the scoring rollers and adjuncts.

Extending over the bars 74 and 75 and transversely of the machine is a paste box 81 having side arms 82 secured on brackets 83 which are secured to the side members 3 and 5 of the main frame, for a purpose hereinafter explained, and supported by this box 81 is a horizontal cam plate 84 carried by a bracket having a vertical arm 85 which is secured to the box 81. The cam plate occupies a position a slight distance above the bars 74 and 75 forwardly of the box 81 and its forward edge is turned upwardly and extends diagonally across the bars 74 and 75, as clearly shown in Figs. 1 and 2, so that when the upper portion of an envelop is advanced between the bars 74 and 75 with the closing flap of the envelop extending above the bars, the flap will, upon meeting and being engaged by the forward edge of the cam plate 84 be thereby turned down toward the side member 3 of the main frame 2 as the flap passes under the plate, for a purpose hereinafter described.

Rearwardly of the box 81 is a second cam plate 86 which is secured to and supported by the bar 74 near the rearward end thereof and which extends beyond the rearward end of the adjacent bar 75. The cam plate 86 extends upwardly from the top of the bar 74 then over the side thereof which faces the bar 75 and then downwardly below the top of the bar 74 in spaced relation thereto. The turned down portion of the cam plate 86 forms a passage between itself and the bar 74 which is, in effect, a continuation of the passage between the bars 74 and 75, with a space between the forward edge of the cam plate 86 and the rearward end of the bar 74, and the passage between the cam plate 86 and bar 74, at the forward end thereof, is wider than the space between the bars 74 and 75 and it grows narrower toward its rearward end and terminates in a width which is substantially equal to the width of the space between the bars 74 and 75. The shape and position of the cam 86 is clearly shown in Figs. 1 and 2 of the drawings, and its function is to engage the flap of an envelop advanced between the bars 74 and 75 to and through the cam passage and turn said flap first downwardly toward the side member 5 of the main frame and then turn said flap downwardly and inwardly against the side of the envelop facing the side member 5, as the envelop and its closing flap passes through the cam passage and emerges from the rearward end thereof, as will be hereinafter explained.

Beyond the rearward end of the cam plate 86 and in alinement with the narrow rearward end portion of the cam passage are two oppositely disposed belts 87 adapted to receive from the cam passage the upper portion of the envelop and its turned down closing flap and clamp and advance them toward the delivery end of the machine. These belts 87 pass around forward pulleys 88 and rearward pulleys 89, as shown. The rearward pulleys 89 turn on shafts carried by brackets 90 on the side members 3 and 5 of the main frame, and the forward pulleys 88 are secured to vertical shafts 91 which turn in suitable bearing brackets 92 on the side members 3 and 5. The upper ends of the shafts 91 are provided with co-acting gear wheels 93 and one of the shafts 91 extends downwardly to and through a bearing bracket 94 on the side member 5, and the lower end thereof carries a bevel gear wheel 95 which meshes with a similar wheel 96 on a transverse shaft 97 mounted to turn in bearings on the side members 3 and 5. The shaft 97 carries a sprocket wheel 98 which is driven by a chain 99 from a sprocket wheel 100 on the main driving shaft 28. A suitable idler 101 is provided to engage the chain 99 and maintain it in proper working relation to the wheels 98 and 100. Thus the belts 87 will be driven by the main shaft 28 and the gearing connecting them therewith. The inner or adjacent portions of the belts 87 which extend between the pulleys 88 and 89 are engaged on their outer faces by two series or sets of suitable spaced pulleys 102 carried by frames 103 having brackets 104 which are adjustably secured on brackets 105 projecting inwardly from the side members 3 and 5 of the main frame. The brackets 104 are adjustable on the brackets 105 by clamp screw and slot connections to permit the pulley frames 103 to be adjusted toward and from each other to vary the pressure of the inner portions of the belts 87 against the parts of the envelops which pass between them.

The box 81 is adapted to contain paste and it has an opening in the rearward wall thereof into which extends one side of a paste applying roller 106. The roller 106 is secured upon a shaft 107 which extends between and turns in bearings 108 on the frame brackets 83. One end of the shaft 107 extends outwardly and has a gear wheel 109 loosely mounted thereon and a collar 110 splined thereon outwardly of the gear wheel 109. The collar 110 and hub of the gear wheel 109 have co-acting teeth which normally engage each other and cause the shaft 107 to be turned when the gear wheel 109 is turned. By moving the collar 110 outwardly by hand the teeth thereof may be disengaged from the gear wheel 109 so that the shaft 107 may be turned independently of the wheel 109 for a purpose hereinafter explained. The gear wheel 109 is in mesh with a gear wheel 111 which turns on a shaft 112 projecting from the side member 5 of the main frame. Loose on the shaft 112 adjacent to the gear wheel 111 and secured thereto is a sprocket wheel 113 which is driven by a chain 114 from a sprocket wheel 115 on the main driving shaft 28, whereby the paste-applying roller 106 is driven by the main shaft 28 and the gearing connecting it therewith. The walls of the box 81 adjacent to the sides of the roller 106 have openings therein in which are seated packing blocks or members 116 which engage the sides of the roller 106 and prevent the escape of paste from the box 81 laterally of the roller 106. Arranged within the box 81 parallel to the roller 106 and slidable on the bottom of the box is a gage bar 117 which is adjustable toward and from the roller 106 to vary the space between the bar 117 and roller 106 and thus regulate the thickness of the layer or film of paste which the roller 106 is permitted to take from the box 81 during the rotation of the roller. The bar 117 is engaged by heads 118 on the inner ends of screw-threaded shafts 119 which are screwed into and through the forward wall of the box 81. The heads 118 turn in suitable openings or bearings formed in the bar 117 and move the same toward and from the roller 106 as the shafts 119 are turned to move them forward or back, as the case may be. The outer ends of the shafts 119 are provided with suitable heads by means of which they may be turned by hand for the adjustment of the bar 117.

Beneath the paste applying roller 106 and parallel thereto is a serrated roller 120 which turns on a shaft projecting from a bracket 121 which is adjustable vertically on a bracket 122 secured to the member 3 of the main frame. The bracket 122 is supported by a screw 123 which is screwed into and through a lug 124 projecting from the bottom thereof. The screw 123 turns freely in a lug 125 on the bracket 122 and it is provided with a thrust collar which rests upon the lug 125. The bottom of the screw 123 has a suitable head thereon by means of which it may be turned to raise and lower the bracket 121 and therewith the roller 120 to vary the space between the rollers 106 and 120. The bracket 121 is guided during the adjustment thereof by the screw 123 and a screw 126 screwed into the bracket 122 through a slot in the bracket 121. The roller 120 extends to a position near the bar 74 and it is adapted to insure the contact of the upper face of the closing flap of an envelop with the paste carried by the roller 106 as the flap passes between the rollers 106 and 120 after being turned down by the cam 84.

Near the forward end of the machine, directly over the bars 74 and 75 are two horizontally-arranged scoring rollers 127 and 128. The roller 127 has a peripheral groove 129 formed therein and the roller 128 has a peripheral rib 130 formed thereon which enters the groove 129. The rollers 127 and 128 are located with respect to the bars 74 and 75 and the line of travel of an envelop guided thereby so that the lower portion of the upwardly projecting closing flap of an envelop advanced between the bars 74 and 75 will pass between and be engaged by the rollers 127 and 128 in a manner to score the same near the union between the closing flap and the body of the envelop and on the line where it is desired to fold the flap by the action of the cams 84 and 86. The rollers 127 and 128 are carried by the upper end portions of shafts 131 and 132. The shaft 130 turns in a bracket 133 on the member 3 of the main frame and the shaft 132 turns in the bracket 80, hereinbefore referred to, and a bracket 134 on the member 5 of the main frame. The lower end of the shaft 132 carries a bevel gear wheel 135 in mesh with a similar wheel 136 on a transverse shaft 137 which extends between and turns in bearings on the side members 3 and 5 of the main frame. The shaft 137 is provided with a sprocket wheel 138 which is driven by a chain 139 from a sprocket wheel 140 on the shaft 97, whereby when the main driving shaft 28 is rotated the scoring wheel 128 will be rotated by the gearing connecting it therewith. A suitable idler 141 is provided to engage the chain 139 and maintain it in proper working relation to the wheels 138 and 140. When the ribbed scoring wheel 128 is turned by power, as just described, and the closing flap of an envelop passes between the wheels 127 and 128, the grooved wheel 127 will be turned in harmony with the wheel 128 by the engagement of the flap with the wheel 127 as the rib 130 presses the flap into the groove 129 to form the score line.

In Figs. 11, 12, 13 and 14 I have shown a form of envelop 154 adapted to be closed and sealed by my improved machine. An envelop of this form comprises parallel side members 150 united at the bottom 153 and along the side edges 152 thereof, and a closing flap 151 projecting upwardly from the top of one of its side members 150, as shown in Figs. 11 and 12, and adapted to be folded down against its other side member 150 to close the envelop, as shown in Figs. 13 and 14. The paper forming this envelop has permanent creases therein forming the lateral edge portions 152 and the bottom 153 thereof.

The operation of the machine, briefly described, is as follows:—

Paste is placed within the box 81 and current is supplied to motor 37 for the actuation of the main driving shaft 28. When the main shaft 28 is thus driven it drives the belts, chains and wheels of the machine in the directions indicated by the arrows at a suitable speed for the proper operation of the machine. Envelops such as shown at 154, containing the commodity to be sealed therein, are placed upon the belt 24 adjacent to the forwardly projecting end portions of the bar 74 and adjacent belt 66 or between the outwardly flaring forward end portions of the bars 74 and 75 and belts 76 at the forward or feed end F of the machine. The envelops 154 are placed upon the belt 24 in an upright position with their respective side faces 150 facing the respective sides of the machine and with the folds in the paper of the envelops forming the respective side edges 152 thereof facing the respective ends of the machine, so that each envelop 154 will be advanced through the machine with one of its lateral edges 152 foremost; or, in other words, so that the sides 150 of each envelop, above the contents thereof may be pressed flat against each other by the engagement of the belts 66 therewith, without forming additional creases in the envelop or opening the creases forming the lateral edges 152 thereof, and so that the belts 38 may engage the central portions of the bulging sides of that portion of each envelop 154 which contains the commodity to be sealed therein. When the envelops 154 to be sealed are thus placed upon the belt 24 the respective sides 150 of the envelops are advanced between the bars 74 and 75 which hold the sides in close parallel relationship, with the tops of the bodies of the envelops in close relation to the tops of the bars 74 and 75 and with the closing flap of the envelops extending entirely above the bars 74 and 75 from the sides of the envelops engaging the bar 74. After the envelops are placed upon the belt 24 in the relation to the belts 24, 38 and 66 and bars 74 and 75, as just described, they are advanced into and through the machine by the belts engaged therewith, the faces of the belts engaging the envelops all traveling at the same rate of speed. As the closing flap 151 of each envelop 154 passes between the scoring rollers 127 and 128, a score line is formed therein by these rollers at or near the junction of the body of the envelop and the closing flap thereof. After being scored the closing flap 151 meets and engages the cam plate 84 and is thereby turned down toward the side member 3 of the main frame to a horizontal position, as shown in Fig. 8, as the flap passes under the cam, the score line acting as a hinge or pivot on which the flap 151 is turned. The flap 151 is held down in this horizontal position by the cam plate 84 until it reaches a position beneath the paste-applying roller 106 and it is directed by the cam plate 84 to and between the rollers 106 and 120. The distance between the rollers 106 and 120 is such that, as the flap 151 passes between them, the roller 120 will cause the top of the flap to engage the paste carried by the roller 106 with the proper pressure necessary to insure the transfer of the film of paste from the roller 106 to the flap. After leaving the paste-applying roller 106 the flap 151 meets and passes through the passage formed by the cam 86, and as it engages the same it is folded, on the hinge formed by the score line therein, down toward the side member 5 of the main frame and inwardly toward the side 150 of the envelop facing the frame member 5, pressing the paste on the flap 151 against the adjacent side 150 of the envelop and thus closing and sealing the same as the envelop passes through the rearward end portion of the passage formed by the cam 86. After the envelop leaves the cam 86 the upper end portion of the body of the envelop 154, with the closing flap 151 pasted against the same, passes between the belts 87 which hold the flap 151 firmly against the body of the envelop during its travel until the paste dries or sets sufficiently to prevent any accidental separation of the closing flap from the adjacent side of the envelop, whereupon the upper portion of the envelop passes from between the belts 87, and thereafter the sealed envelop may be removed by hand from the carrying belt 24 or it may be discharged therefrom into a suitable receptacle at the rear or discharge end of the machine as the belt 24 passes around the pulley 23.

It will be observed that the belts 66 hold the sides of the envelops together above the contents thereof during the travel thereof past the scoring rollers, folding cams and pasting devices, and that the bars 74 and 75 hold the sides of the upper end portions of the envelops together above the belts 66 during the travel thereof past the scoring rollers, the folding cam 84 and pasting roller 106, and thereafter direct the sides of the upper end portion of the envelop into the passage formed by the folding cam 86, thus insuring the proper scoring, folding and pasting of the closing flaps 151 of the envelops 154. It will also be observed that the bulging sides of the lower portions of the envelops which inclose the contents thereof are held in reasonably close relationship by the belts 38 during the travel of the envelops past the creasing rollers, folding cams and pasting devices, thus permitting the bars 74 and 75 and belts 66 to hold the sides 150 of the upper portions of the envelops together for the proper closing thereof. Indeed, the inner portions of the belts 38 may be adjusted toward and from each other, by operating the hand wheels 62, to cause the belts 38 to compress the contents of the envelops and hold the sides of the lower portions thereof sufficiently close together to insure the proper close relationship of the sides 150 of the upper portions thereof between the belts 66 and between the bars 74 and 75.

The guiding bars 74 and 75 and belts 66 and the scoring, folding and pasting devices, which act upon the upper portions of the envelops and their closing flaps, are all supported by the main frame 2 of the machine; and the carrying and guiding belts 24 and 38 are supported and carried by the vertically adjustable supplemental frame 8. Therefore, it will be understood that by turning the shaft 19 by hand, the belts 24 and 38, which support and guide the lower portions of the envelops and the contents thereof, may be raised and lowered relatively to the devices which act upon the upper portions of the envelops and their closing flaps, so that the machine may be quickly and easily set to acommodate envelops of different sizes or lengths.

When the envelops and their contents are not too heavy they may be supported, carried and guided through the machine entirely by the belts 66 which will clamp the upper portions of the envelops between them with sufficient pressure for this purpose. In this case the belts 24 and 38 may be lowered so that they will not contact with the envelops or they may be removed from the machine. The pressure of the inner portions of the belts 66 against the envelops may be nicely regulated by adjusting them toward and from each other as previously explained.

When the paste within the box 81 hardens upon the paste-applying roller 106 sufficiently to prevent the free turning thereof or the proper distribution of the paste upon the periphery of the roller, due to the machine standing idle with paste in the box 81, the collar or sleeve 110 may be moved outwardly by hand to disengage its teeth from the teeth of the hub or the gear wheel 109, and, thereafter, the shaft 107 and roller 106 may be turned backward and forward by hand, by the application of a suitable crank to the outer squared end of the shaft 107, until the roller 106 takes the paste properly from the box 81 to apply to the closing flaps of the envelops, whereupon the teeth of the collar 110 may be reëngaged with the teeth on the hub of the gear wheel 109 to permit the roller 106 to be turned by the mechanism of the machine, as previously explained.

I claim as my invention:

1. The combination of a supporting frame, two oppositely disposed belts adapted to grip an envelop between them and to support and advance the same, said belts being round in cross section, means including grooved rollers supported to turn on vertical axes for guiding and actuating the belts, and means adjacent to said belts to close the open end of an envelop advanced thereby.

2. The combination of a supporting frame, two oppositely disposed belts adapted to grip an envelop between them and to support and advance the same, means for guiding and actuating the belts, two fixed parallel bars above said belts for receiving and guiding the open end portion of an envelop advanced by the belts, and means adjacent to said bars to close the open end of said envelop.

3. The combination of a supporting frame, two oppositely disposed belts adapted to grip the upper portion of an envelop between them and to advance the same, said belts being round in cross section, means including grooved rollers supported to turn on vertical axes for guiding and actuating the belts, supporting means for the bottom of said envelop, and means adjacent to said belts to close the open end of an envelop advanced thereby.

4. The combination of a supporting frame, two oppositely disposed belts adapted to grip an envelop between them above the contents of the envelop and to support and advance the envelop, two oppositely disposed belts arranged in spaced relation to each other below the first named belts to receive and guide said envelop and the contents thereof between them, means for guiding and actuating said belts, and means adjacent to said belts to close the open end of an envelop advanced thereby.

5. The combination of a supporting frame, two oppositely disposed belts adapted to grip an envelop between them above the contents of the envelop and to support and advance the envelop, two oppositely disposed belts arranged in spaced relation to each other below the first named belts to receive and guide said envelop and the contents thereof between them, means for guiding and actuating said belts, supporting means for the bottom of said envelop, and means adjacent to said belts to close the open end of an envelop advanced thereby.

6. The combination of a supporting frame, two oppositely disposed belts adapted to grip the upper portion of an envelop between them and to advance the same, means for guiding and actuating the belts, supporting means for the bottom of said envelop, two fixed parallel bars above said belts for receiving and guiding the open end portion of an envelop advanced by the belts, and means adjacent to said bars to close the open end of said envelope.

7. The combination of a supporting frame, two oppositely disposed belts adapted to grip an envelop between them above the contents of the envelope and to support and advance the envelope, two oppositely disposed belts arranged in spaced relation to each other below the first named belts to receive and guide said envelop and the contents thereof between them, means for guiding and actuating said belts, supporting means for the bottom of said envelop, two fixed parallel bars above said belts for receiving and guiding the open end portion of an envelop advanced by the belts, and means adjacent to said bars to close the open end of said envelope.

8. The combination of a supporting frame, means for supporting and advancing an envelop, two fixed parallel bars adjacent to said means for receiving and guiding the open end portion of an envelop advanced by said means, and means adjacent to said bars to close the open end of said envelop.

9. The combination of a supporting frame, means for supporting and advancing an envelop having an open end and a closing flap therefor, two fixed parallel bars adjacent to said means for receiving and guiding the open end portion of said envelop, and means adjacent to said bars for folding said flap, said bars preventing the displacement of the open end portion of said envelop from its line of travel during the operation of folding said flap.

10. The combination of a supporting frame, means for supporting and advancing an envelop having an open end and a closing flap therefor, two fixed parallel bars adjacent to said means for receiving and guiding the open end portion of said envelop, means for applying paste to said flap while the envelop is guided by said bars, and means adjacent to said bars to fold said flap into closing position after the application of paste thereto.

11. The combination of a supporting frame, means for supporting and advancing an envelop having an open end and a closing flap therefor, two fixed parallel bars adjacent to said means for receiving and guiding the open end portion of said envelop, means for scoring said flap while the envelope is guided by said bars, and means adjacent to said bars for folding said flap on the score line thereof.

12. The combination of a supporting frame, means for supporting and advancing an envelop having an open end and a closing flap therefor, two fixed parallel bars adjacent to said means for receiving and guiding the open end portion of said envelop, means for scoring said flap while the envelope is guided by said bars, means for applying paste to said flap while the envelop is guided by said bars, and means adjacent to said bars to fold said flap on its score line into closing position after the application of paste thereto.

13. The combination of a supporting frame, means for supporting and advancing an envelop having an open end and a closing flap therefor, means for applying paste to said flap while the envelope is advanced by the first named means, means to fold said flap into closing position after the application of paste thereto, and means extending beyond the folding means to hold said flap in said closing position while the envelope is advanced by the first named means.

14. The combination of a supporting frame, means for supporting and advancing an envelop having an open end and a closing flap therefor, means for applying paste to said flap while the envelope is advanced by the first named means, means to fold said flap into closing position after the application of paste thereto, two oppositely disposed belts adapted to receive said flap and the part of the envelope against which it is folded and hold them together between the belts while the envelope is advanced by the first named means, and means for guiding and actuating the belts.

15. The combination of a supporting frame, means for supporting and advancing an envelop having an open end and a closing flap therefor, and a scoring device comprising two rollers between which said flap passes as said envelop is advanced by said means, one roller having an annular groove therein and the other roller having an annular rib adapted to force a part of said flap into said groove, and means for supporting and actuating said rollers.

16. The combination of a supporting frame, means for supporting and advancing an envelop in a vertical position, said envelop having an open top and a closing flap extending upwardly from one side thereof, a paste applying device including a horizontally arranged paste applying roller and actuating means therefor, and means to fold said flap outwardly and downwardly to pass beneath said roller to receive paste therefrom during the travel of the envelop.

17. The combination of a supporting frame, means for supporting and advancing an envelop in a vertical position, said envelop having an open top and a closing flap extending upwardly from one side thereof, a paste applying device including a horizontally arranged paste applying roller and actuating means therefor, means to fold said flap outwardly and downwardly to pass beneath said roller to receive paste therefrom during the travel of the envelop, and a support beneath said roller for said outwardly folded flap causing all parts of the upper face of the flap to receive paste from the roller.

18. The combination of a supporting frame, means for supporting and advancing an envelop in a vertical position, said envelop having an open top and a closing flap extending upwardly from one side thereof, two fixed parallel bars above said means for receiving and guiding the upper portion of said envelop adjacent to the open top thereof, a paste applying device including a horizontally arranged paste applying roller and actuating means therefor, and means to fold said flap outwardly and downwardly over one of said bars to pass beneath said roller to receive paste therefrom during the travel of the envelop.

19. The combination of a supporting frame, means for supporting and advancing an envelop in a vertical position, said envelop having an open top and a closing flap extending upwardly from one side thereof, two fixed parallel bars above said means for receiving and guiding the upper portion of said envelop adjacent to the open top thereof, a paste applying device including a horizontally arranged paste applying roller and actuating means therefor, means to fold said flap outwardly and downwardly over one of said bars to pass beneath said roller to receive paste therefrom during the travel of the envelop, and a scoring device above said bars and in advance of said roller to score said flap on the fold line thereof.

20. The combination of a supporting frame, means for supporting and advancing an envelop in a vertical position, said envelop having an open top and a closing flap extending upwardly from one side thereof, a paste applying device including a horizontally arranged paste applying roller and actuating means therefor, means to fold said flap outwardly and downwardly to pass beneath said roller to receive paste therefrom during the travel of the envelop, and means to fold said flap with the paste thereon downwardly and inwardly against one side of the body of the envelop to close the open top thereof.

21. The combination of a supporting frame, means for supporting and advancing an envelop in a vertical position, said envelop having an open top and a closing flap extending upwardly from one side thereof, two fixed parallel bars above said means for receiving and guiding the upper portion of said envelop adjacent to the open top thereof, a paste applying device including a horizontally arranged paste applying roller and actuating means therefor, means to fold said flap outwardly and downwardly over one of said bars to pass beneath said roller to receive paste therefrom during the travel of the envelop, and means to fold said flap with the paste thereon downwardly and inwardly against one side of the body of the envelop to close the open top thereof.

22. The combination of a supporting frame, means for supporting and advancing an envelop in a vertical position, said envelop having an open top and a closing flap extending upwardly from one side thereof, two fixed parallel bars above said means for receiving and guiding the upper portion of said envelop adjacent to the open top thereof, a paste applying device including a horizontally arranged paste applying roller and actuating means therefor, means to fold said flap outwardly and downwardly over one of said bars to pass beneath said roller to receive paste therefrom during the travel of the envelop, a scoring device above said bars and in advance of said roller to score said flap on the fold line thereof, and means to fold said flap with the paste thereon downwardly and inwardly against one side of the body of the envelop to close the open top thereof.

23. The combination of a supporting frame, means for supporting and advancing an envelop in a vertical position, said envelop having an open top and a closing flap extending upwardly from one side thereof, two fixed parallel bars above said means for receiving and guiding the upper portion of said envelop adjacent to the open top thereof, and a cam extending from a position above to a position below the top of one of said bars for folding said flap downwardly and inwardly toward one side of the body of the envelop.

24. The combination of a supporting frame, means for supporting and advancing an envelop in a vertical position, said envelop having an open top and a closing flap extending upwardly from one side thereof, two fixed parallel bars above said means for receiving and guiding the upper portion of said envelop adjacent to the open top thereof, and a cam extending upwardly from one of said bars then over the path of travel of said flap and then downwardly below the top of said bars for folding said flap downwardly and inwardly toward one side of the body of the envelop.

25. The combination of a supporting frame, means for supporting and advancing an envelop in a vertical position, said envelop having an open top and a closing flap extending upwardly from one side thereof, two fixed parallel bars above said means for receiving and guiding the upper portion of said envelope adjacent to the open top thereof, and a cam extending upwardly from one of said bars then over the path of travel of said flap and then downwardly below the top and beyond the end of the other of said bars in the direction of travel of the envelop for folding said flap downwardly and inwardly toward one side of the body of the envelop.

26. The combination of a supporting frame, means for supporting and advancing the upper portion of an envelop in a vertical position, said envelop having an open top and a closing flap extending from one side thereof, means for supporting the lower portion of said envelop, means for folding said flap downwardly and inwardly to close the open top of the envelop during the travel thereof, and means operative to raise and lower the second named means relatively to the first and third named means.

27. The combination of a supporting frame, means for supporting and advancing the upper portion of an envelop in a vertical position, said envelop having an open top and a closing flap extending from one side thereof, means for supporting and advancing the lower portion of said envelop, means for folding said flap downwardly and inwardly to close the open top of the envelop during the travel thereof, and means operative to raise and lower the second named means relatively to the first and third named means.

28. The combination of a main frame, a supplemental frame, means carried by the supplemental frame to support and advance an envelop having an open end and a closing flap therefor, means carried by the main frame to fold said flap downwardly and inwardly to close the open top of the envelop during the travel thereof, and means operative to raise and lower the supplemental frame relatively to the main frame.

29. The combination of a main frame, a supplemental frame, means to receive and advance an envelop having an open end and a closing flap therefor, said supplemental frame being provided with means to support the envelop during the travel thereof, means carried by the main frame to fold said flap downwardly and inwardly to close the open top of the envelop during the travel thereof, and means operative to raise and lower the supplemental frame relatively to the main frame.

30. The combination of a main frame, a supplemental frame, means to receive and advance an envelop having an open end and a closing flap therefor, said means including two oppositely disposed belts arranged in spaced relation to each other to receive and guide said envelop and the contents thereof between them, means carried by the supplemental frame for supporting and guiding said belts, actuating means for said belts, means carried by the main frame to fold said flap downwardly and inwardly to close the open top of the envelop during the travel thereof, and means operative to raise and lower the supplemental frame relatively to the main frame.

31. The combination of a main frame, a supplemental frame, means to receive and advance an envelop having an open end and a closing flap therefor, said means including two oppositely disposed belts arranged in spaced relation to each other to receive and guide said envelop and the contents thereof between them, means carried by the supplemental frame for supporting and guiding said belts, actuating means for said belts, means on said supplemental frame operative to adjust one of said belts toward and from the other to vary the space between them, means carried by the main frame to fold said flap downwardly and inwardly to close the open top of the envelop during the travel thereof, and means operative to raise and lower the supplemental frame relatively to the main frame.

32. The combination of a main frame, a supplemental frame, two oppositely disposed belts adapted to receive between them and to advance an envelop having an open end and a closing flap therefor, means carried by the main frame for supporting and guiding said belts, actuating means for said belts, means carried by the main frame to fold said flap downwardly and inwardly to close the open top of the envelop during the travel thereof, said supplemental frame being provided with means to support the envelop during the travel thereof, and means operative to raise and lower the supplemental frame relatively to the main frame.

33. The combination of a main frame, a supplemental frame, two oppositely disposed belts adapted to receive between them and to advance an envelop having an open end and a closing flap therefor, means carried by the main frame for supporting and guiding said belts, actuating means for said belts, two fixed parallel bars carried by the main frame above said belts for receiving and guiding the open end portion of said envelop, means carried by the main frame to fold said flap downwardly and inwardly to close the open top of the envelop during the travel thereof, said supplemental frame being provided with means to support the envelop during the travel thereof, and means operative to raise and lower the supplemental frame relatively to the main frame.

34. The combination of a main frame, a supplemental frame, means to receive and advance an envelop having an open end and a closing flap therefor, said means including a belt to receive the bottom of the envelop and to support the same during the travel thereof, means carried by the supplemental frame for supporting and guiding said belt, actuating means for said belt, means carried by the main frame to fold said flap downwardly and inwardly to close the open top of the envelop during the travel thereof, and means operative to raise and lower the supplemental frame relatively to the main frame.

35. The combination of a main frame, a supplemental frame, means operative to raise and lower the supplemental frame relatively to the main frame, means to receive and advance an envelop having an open end and a closing flap therefor, means carried by the main frame to fold said flap downwardly and inwardly to close the open top of the envelop during the travel thereof, the second named means including a belt to receive the bottom of the envelop and to support the same during the travel thereof, means carried by the supplemental frame for supporting and guiding said belt, two oppositely disposed belts arranged in spaced relation to each other to receive and guide said envelop and the contents thereof between them, means carried by the supplemental frame for supporting and guiding said belts, and actuating means for said belts.

36. The combination of a main frame, a supplemental frame, means operative to raise and lower the supplemental frame relatively to the main frame, means to receive and advance an envelop having an open end and a closing flap therefor, means carried by the main frame to fold said flap downwardly and inwardly to close the open top of the envelop during the travel thereof, the second named means including a belt to receive the bottom of the envelop and to support the same during the travel thereof, means carried by the supplemental frame for supporting and guiding said belt, two oppositely disposed belts arranged in spaced relation to each other to receive and guide said envelop and the contents thereof between them, means carried by the supplemental frame for supporting and guiding said belts, two oppositely disposed belts adapted to receive said envelop between them above the contents of the envelop and to advance the same, means carried by the main frame for supporting and guiding the last named belts, and actuating means for said belts.

37. The combination of a main frame, a supplemental frame, means operative to raise and lower the supplemental frame relatively to the main frame, means to receive and advance an envelop having an open end and a closing flap therefor, means carried by the main frame to fold said flap downwardly and inwardly to close the open top of the envelop during the travel thereof, the second named means including a belt to receive the bottom of the envelop and to support the same during the travel thereof, means carried by the supplemental frame for supporting and guiding said belt, two oppositely disposed belts arranged in spaced relation to each other to receive and guide said envelop and the contents thereof between them, means carried by the supplemental frame for supporting and guiding said belts, two oppositely disposed belts adapted to receive said envelop between them above the contents of the envelop and to advance the same, means carried by the main frame for supporting and guiding the last named belts, actuating means for said belts, and two fixed bars carried by the main frame above said belts for receiving and guiding the open end portion of said envelop during the travel thereof.

In testimony whereof I affix my signature hereto.

TRUED B. LUNDIN.